United States Patent

Wanninger

(10) Patent No.: US 8,385,706 B2
(45) Date of Patent: Feb. 26, 2013

(54) OPTICAL ELEMENT AND METHOD FOR THE PRODUCTION THEREOF

(75) Inventor: Mario Wanninger, Harting (DE)

(73) Assignee: Osram Opto Semiconductors GmbH, Regensburg (DE)

(*) Notice: Subject to any disclaimer, the term of this patent is extended or adjusted under 35 U.S.C. 154(b) by 594 days.

(21) Appl. No.: 11/815,030

(22) PCT Filed: Jan. 19, 2006

(86) PCT No.: PCT/DE2006/000081
§ 371 (c)(1),
(2), (4) Date: Mar. 20, 2008

(87) PCT Pub. No.: WO2006/079316
PCT Pub. Date: Aug. 3, 2006

(65) Prior Publication Data
US 2008/0279519 A1    Nov. 13, 2008

(30) Foreign Application Priority Data

Jan. 31, 2005  (DE) .......................... 10 2005 004 447
Feb. 14, 2005  (DE) .......................... 10 2005 006 635

(51) Int. Cl.
*G02B 6/10* (2006.01)
*G02B 6/00* (2006.01)

(52) U.S. Cl. ........... 385/129; 385/14; 385/133; 385/146

(58) Field of Classification Search .................... 385/14, 385/129–133, 146, 147; 359/326–332; 264/1.24
See application file for complete search history.

(56) References Cited

U.S. PATENT DOCUMENTS

| | | | |
|---|---|---|---|
| 4,805,984 A * | 2/1989 | Cobb, Jr. ................. | 385/133 |
| 5,596,671 A * | 1/1997 | Rockwell, III ............ | 385/147 |
| 5,642,453 A | 6/1997 | Margulis et al. | |
| 5,822,119 A | 10/1998 | Rasmussen et al. | |
| 6,188,812 B1 | 2/2001 | Kao et al. | |
| 6,850,683 B2 * | 2/2005 | Lee et al. ................. | 385/129 |
| 6,993,242 B2 * | 1/2006 | Winston et al. ........... | 385/146 |
| 7,433,565 B2 * | 10/2008 | Joseph et al. ............. | 385/128 |
| 2001/0036553 A1 | 11/2001 | Satake et al. | |
| 2001/0048968 A1 * | 12/2001 | Cox et al. ................. | 427/162 |
| 2003/0214080 A1 | 11/2003 | Maki et al. | |
| 2004/0062028 A1 | 4/2004 | Winston et al. .......... | 362/31 |

(Continued)

FOREIGN PATENT DOCUMENTS

| | | |
|---|---|---|
| DE | 3406393 | 8/1985 |
| DE | 4404425 | 8/1995 |

(Continued)

OTHER PUBLICATIONS

International Search Report for PCT/DE2006/000081, dated May 16, 2006.

(Continued)

*Primary Examiner* — Daniel Petkovsek
(74) *Attorney, Agent, or Firm* — Fish & Richardson P.C.

(57) ABSTRACT

Described is an optical element for guiding electromagnetic radiation. The optical element includes a base body and at least one film, wherein the film is configured to adhere to the base body and to form an intimate connection with the base body without using an adhesion and is arranged such that the electromagnetic radiation passes through it.

13 Claims, 2 Drawing Sheets

U.S. PATENT DOCUMENTS

| | | | |
|---|---|---|---|
| 2004/0062513 A1 | 4/2004 | Sung et al. | |
| 2004/0105646 A1* | 6/2004 | Fukuda et al. | 385/129 |
| 2004/0120667 A1 | 6/2004 | Aylward et al. | |
| 2005/0009048 A1 | 1/2005 | Sagner et al. | |
| 2006/0153511 A1* | 7/2006 | Franklin et al. | 385/123 |

FOREIGN PATENT DOCUMENTS

| | | |
|---|---|---|
| DE | 19717004 | 8/1998 |
| DE | 19858849 | 6/2000 |
| DE | 19860696 | 7/2000 |
| EP | 1188534 | 3/2002 |
| JP | 53071845 | 6/1978 |
| JP | 63195605 | 8/1988 |
| JP | 2000006186 | 1/2000 |
| JP | 2000025161 | 1/2000 |
| JP | 20000355020 | 12/2000 |
| JP | 2001030405 | 2/2001 |
| JP | 2001138355 | 5/2001 |
| JP | 2002-072203 | 3/2002 |
| JP | 2003-215314 | 7/2003 |
| TW | 460598 | 10/2001 |
| TW | 463433 | 11/2001 |
| TW | 575508 | 2/2004 |
| WO | WO 93/09450 | 5/1993 |
| WO | WO 2005/009048 | 1/2005 |

OTHER PUBLICATIONS

"Notice of Reasons for Refusal", English Translation, Japanese Patent Application No. 2007-552498, 4 pages, Mar. 9, 2011.

"Final Notification of Reasons for Refusal," English Translation, Japanese Patent Application No. 2007-552498, 5 pages, dispatched on Aug. 17, 2011.

* cited by examiner

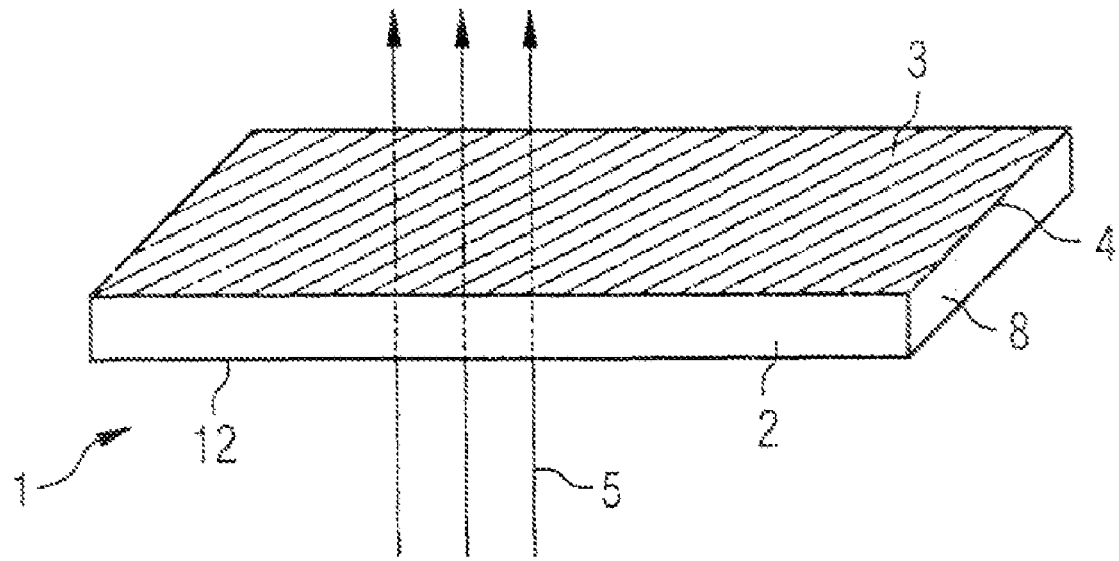
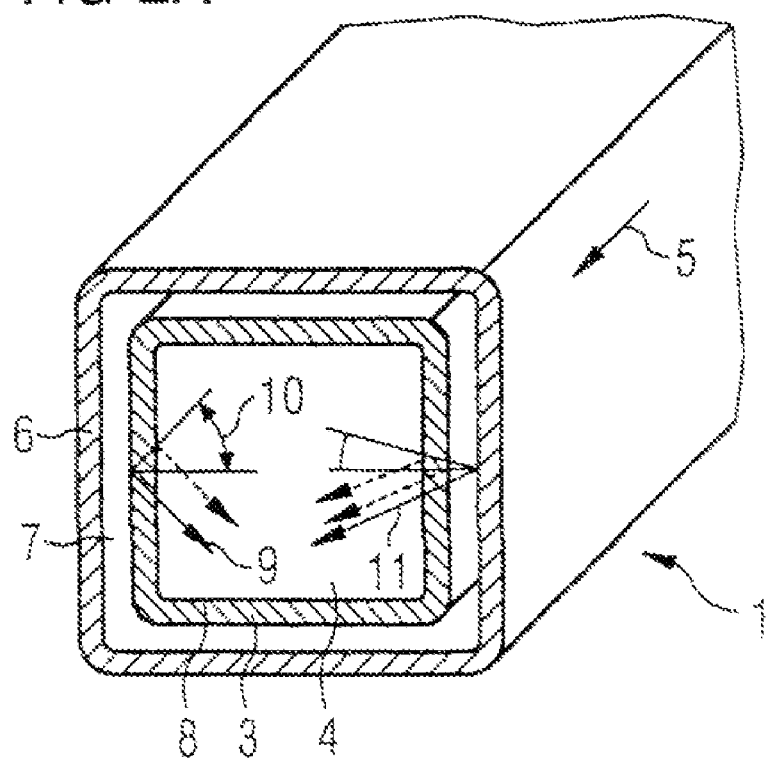

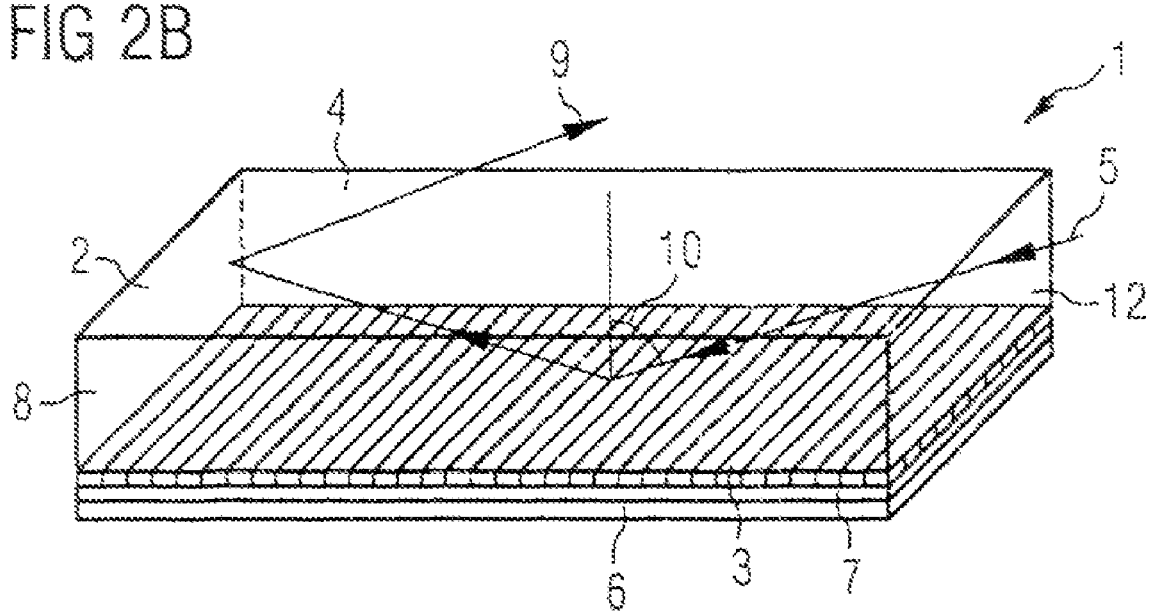
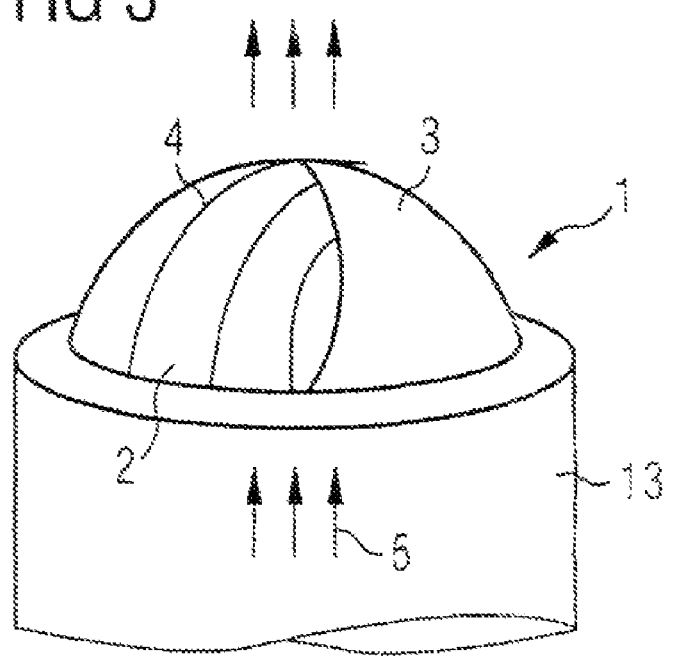

OPTICAL ELEMENT AND METHOD FOR THE PRODUCTION THEREOF

CROSS-REFERENCE TO RELATED APPLICATIONS

This application is the National Stage of International Application No. PCT/DE2006/000081, filed on Jan. 19, 2006, which claims the priority to German Patent Applications Serial No. 10 2005004447.6, filed on Jan. 31, 2005, and Serial No. 10 2005006635.6 filed on Feb. 14, 2005. The contents of all applications are hereby incorporated by reference in their entireties.

FIELD OF THE INVENTION

The invention relates to an optical element and a method for the production thereof.

BACKGROUND

A device for diffusely illuminating transparent surfaces or bodies is known from Patent Application DE 44 040 425 A1. To obtain good diffuse illumination even with weak light sources, the device comprises at least one light source that is disposed at a core of the device and emanates light inward into the interior. A partially transparent layer and an at least partially reflective layer are disposed on the core.

SUMMARY

Objects of the present invention are to specify an optical element that can be used in a particularly varied manner and a method for the production thereof.

An optical element according, to the invention, which is preferably configured to guide monochromatic or polychromatic electromagnetic radiation, comprises a base body and at least one film. The film adheres in intimate connection to the base body and is arranged such that the electromagnetic radiation passes through it.

Such an optical element for guiding electromagnetic radiation, particularly preferably in the visible range, can be composed of a base body and a film.

The radiation guided through the optical element impinges on a radiation entrance lace and on a radiation exit face. The radiation exit face can be arranged parallel or perpendicular to the radiation entrance face. Both faces are part of the surface of the optical element.

The base body is advantageously formed of a transparent material. Examples of usable transparent materials that are radiation-transparent and do not scatter radiation are epoxy resins, acrylic resins, silicone resins or mixtures of these resins. However, the base body can also comprise an optically active material. An optically active, material can, for example, contain particles serving to convert the radiation into radiation of another wavelength or to effect scattering.

The geometrical shape of the base body can be suited, to the intended use of the optical element, and can, for example, be plate-shaped or lens-shaped.

Particularly preferably, the base body is configured as a waveguide or lens, and in combination with the film is suitable, for example, for uniformly backlighting a display device, for example an LCD, or for shaping the radiation.

The film preferably adheres in intimate connection to the surface of the base body without any need for an adhesion-promoting interlayer, for example a glue.

The film can be located on various sides of the base body. One option is to dispose the film on the side occupied by the radiation exit face of the optical element, such as a lens, for example. Another option is to dispose the film on the side occupied by the radiation entrance face of the optical element, such as a lens, for example. A further option is to dispose the film, not on the respective sides occupied by the radiation entrance or exit faces of the optical element, but on one or more of the other lateral faces; this can be suitable particularly in the case of an optical element in the form of a waveguide.

The radiation guided through the base body preferably passes through the film. In this case it has proven advantageous to use transparent or translucent materials for the film. Translucent materials, unlike transparent materials, can at least partially scatter the radiation.

Furthermore, the film can be an optically active film, which means that properties of the radiation are altered by the film. For example, the shaping, the wavelength or the intensity of the radiation can be influenced. A combination of influences on these variables may also be contemplated. By contrast, a film is considered to be optically inactive if the radiation merely passes through it unaffected, apart from a negligible displacement of the beam.

For example, the shaping of the radiation can be influenced by means of particles in the film, that scatter the radiation. Furthermore, a film having a structure can be used to obtain a lens effect.

The film preferably contains phosphors to convert the radiation into radiation of another wave length.

In a preferred embodiment, the film is disposed on the side occupied by the radiation exit face of the optical element. With this type of arrangement, it is possible to influence the shaping of the radiation extracted from the optical element, for example through the use of a partially transparent film having a structure.

The intimate connection, between the film and the base body has in this case proven particularly advantageous for the intensity of the extracted radiation. This is because an intimate connection, as opposed to mechanical mounting of the film, avoids the formation of an air gap, thereby reducing radiation losses and total reflection.

In a further embodiment, the film is disposed on one or more sides of the optical element, and specifically where neither the radiation entrance face nor the radiation exit face is located.

The film can be transparent or translucent. Disposed after the film is another film, preferably a reflector film. It is also conceivable for a plurality of additional films, for instance in the form of a film stack, to be disposed after the film.

An air gap is formed between the film and the reflector film in this case.

Radiation fractions whose angle of incidence (relative to the surface normal) is greater than the angle of total reflection are advantageously totally reflected at the transition from the film, the optically denser medium, to the environment (usually air), the optically thinner medium. The fraction of the radiation that passes through the air gap can be reflected front, the downstream reflector film. A large proportion of the radiation striking the lateral faces of the base body can therefore be reflected, and the radiation can, on the whole, be guided through the base body with low losses. This preferred arrangement therefore increases reflectance, which has a positive effect on the illuminance of the optical element.

Use of the last-cited arrangement as a waveguide can be made, for example, in connection with the visualization of data in mobile and portable electronic devices, where flat panel display technology plays a major role. Flat panel displays can be implemented as liquid crystal displays (LC displays). This technology is distinguished by low-cost producibility; low electric power consumption, low weight and low space consumption, LC displays are not self-emitting, however, and therefore require backlighting, which can be optimally implemented for example by means of the invention, which is distinguished by the high luminance of the optical element. One advantage of this type of implementation is the use of passive elements, for example a film/air gap/reflector film arrangement, to increase reflectance, as opposed to the use of additional active elements, for example LEDs, which would require additional energy.

In the production of an optical element, in the context of the invention the film is first placed in an injection mold. A filler material is then fed into the injection mold, for example by means of an injection nozzle, an intimate connection being formed between the filler material and the film. The base body is fabricated from the filler material, which is preferably a transparent material. However, it is also conceivable for the filler material to contain particles, for example for scattering or wavelength-converting the radiation.

The optical element is taken out of the mold as soon as the molding material has cooled down to sufficient demoldability, which advantageously can take place without any significant idle time alter production.

Further features, advantages and improvements of an optical element will emerge from the following exemplary embodiments, described in conjunction with FIGS. 1 to 3.

BRIEF DESCRIPTION OF THE DRAWINGS

FIG. 1 is a perspective side view of a first exemplary embodiment of an optical element, FIG. 2a is a perspective sectional view of a second exemplary embodiment of an optical element, FIG. 2b is a perspective side view of a third exemplary embodiment of an optical element, FIG. 3 is a perspective side view of a fourth exemplary embodiment of an optical element.

DETAILED DESCRIPTION

In the exemplary embodiments and figures, like or like-acting elements are provided with the same respective reference numerals.

A first exemplary embodiment of an optical element 1 is illustrated schematically in FIG. 1. The optical element 1 is configured here as a flat, plate-shaped, waveguide. The waveguide comprises a base body 2 and a film 3. The base body 2 preferably contains a transparent material, for example an epoxy resin, an acrylic resin, a silicone resin or a mixture of these resins. It is also conceivable for the material to contain particles, for example dyestuffs for changing the wavelength of the radiation 5 coupled into the base body.

The film 3 is particularly preferably made of an at least partially transparent material. It may, for example, be provided with structure having the effect of a lens. It may contain dyestuffs to change the wavelength of the radiation 5. However, particles for scattering the radiation are also an option.

The electromagnetic radiation 5, preferably in the visible range, is emitted by a radiation source (not-shown), preferably one or more LEDs.

The monochromatic or polychromatic electromagnetic radiation 5 is coupled into the optical element 1 via the radiation entrance face 12 and is uniformly distributed over the rectangular surface. The radiation passes through base body 2 and film 3 and exits through radiation exit face 4, which is arranged parallel to radiation, entrance face 12. Alternatively, radiation exit face 4 could be arranged perpendicularly to the radiation entrance face, which would then be located, for example, on the side face 8 of the base body 2. In the latter arrangement, the incoupling of the radiation would take place in the longitudinal direction of the optical, element 1.

The flat waveguide can be used, for example, to uniformly illuminate a display unit, (not shown) disposed after the optical element 1.

In the second exemplary embodiment, depicted in FIG. 2a, the optical element 1 is configured as a rope-shaped waveguide. The rope-shaped waveguide comprises a base body 2, a film 3 and a reflector film 6, which is disposed after film 3. In sectional view, film 3 and reflector film 6 surround the base, body 2 in a ring- or frame-like manner.

The film 3 adheres in intimate connection to the side face 8 of base body 2. This intimate connection is created merely by back-injecting the film 3 with a, for example, transparent material from which the base body 2 is formed, and advantageously requires no adhesion-promoting interlayer between the film 3 and the base body.

The reflector film 6 is disposed after film 3, and specifically is placed on film 3 without strengthening the adhesion, due to the forces acting between the two films. In this type of arrangement, an air gap 7 is formed between the two films.

As in the first exemplary embodiment, the base body 2 preferably contains a transparent or partially transparent material that may comprise particles having the aforesaid effect.

A transparent or translucent material is advantageously used, for the film 3.

The radiation 5 coming from a radiation-emitting source (not shown) crosses the rope-like waveguide and is reflected to the center of the base body as soon as it strikes the side face 8 of the base body.

As illustrated in FIG. 2a, the radiation can favorably be reflected from two locations: from the film 3 adjoining the air gap 7 and from the reflector film 6.

Since the material of the film 3 has a higher index of refraction than air, at the transition between the film 3 and the air gap 7, the radiation striking the film 3 at an angle 10 equal to or greater than the angle of total reflection can be totally reflected (totally reflected radiation 9).

The fraction of the radiation that strikes the film 3 at a smaller angle than the angle of total reflection may be partially reflected by the film 3 or may pass through the air gap 7. The fraction of the radiation that radiates through the film 3 can be reflected by the reflector film 6 disposed thereafter (reflected radiation 11).

All in all, a high reflectance can thus be obtained by means of the two-layer film arrangement.

The electromagnetic radiation 5 is guided by the waveguide and extracted from the waveguide via radiation exit face 4.

A third exemplary embodiment of an optical element 1 is illustrated in FIG. 2b. The optical element 1 is configured here as a flat, plate-shaped waveguide. The waveguide comprises a base body 2 and at least two films. Film 3 and reflector film 6 are disposed on the side opposite radiation exit face 4. As in the second exemplary embodiment, there is an air gap 7 between these two films. The same physical, conditions hold true with regard to the reflection of the radiation from the films.

A beam path is illustrated by way of example. The electromagnetic radiation 5 is coupled into the optical element 1 through radiation entrance face 12. The electromagnetic radiation 5 radiates through the base body 2. Radiation striking the film 3 at an angle 10 equal to or greater than the angle of total reflection is totally reflected. The totally reflected radiation can further strike a side face 8 and be reflected again before exiting the optical element 1 at radiation exit face 4.

In a preferred exemplary embodiment, a film and a reflector film with an air gap between them are additionally disposed on one or more side faces (this arrangement not shown), such that the radiation striking the side face 8 at an angle equal to or greater than the angle of total reflection is totally reflected.

In addition, an optically active film can also be disposed on the radiation entrance face (this arrangement not shown).

All in all, a uniform reflectance can thus be obtained by means of the two-layer film arrangement.

FIG. 3 depicts a fourth exemplary embodiment of an optical element 1. A perspective side view of an optical element 1 is shown.

A carrier 13 comprises on its surface a base body 2 of an optical element in the form of a dome-shaped cap. This preferably spherically curved cap is covered with a film 3 that conforms in intimate connection to the surface of the cap 11.

The carrier 13 has, for example, a cylindrical shape. It can be configured as a hollow metal cylinder that is filled with air in its interior or comprises in its interior a transparent material, for example an epoxy resin, an acrylic resin, a silicone resin, or a mixture of these resins, for example topped off with a reflector film at the surface with the environment.

Electromagnetic radiation 5, preferably in the visible range, can advantageously be guided through by means of such a carrier. The main direction of the radiation guided through the carrier 13 in tins fashion extends parallel to the outer wall of the carrier 13.

At the end of the carrier 13, the radiation strikes the base body 2. This base body 2 preferably contains a transparent material and is configured for example in the form of a collecting lens. The radiation 5 guided through the carrier 13 can thus be given a specific shape. For example, a parallel ray bundle coming from the carrier and striking the collecting lens can be focused to a point downstream of the optical element.

Film 3, which adheres in intimate connection to the cap 11, is preferably an optically active film, i.e., it can be transparent or contain particles, for example for additional beam shaping or for changing the color of the incident radiation.

The intimate connection between the lens 3, which can also be a scattering lens, and the optically active film 3 has proven advantageous because it serves, to prevent radiation losses that occur when the film for example is mounted on the base body by means of a glue.

It is understood that the features of the invention disclosed in the description, the drawing and the claims may be essential to the invention both individually and in any possible combination.

The invention claimed is:

1. An optical element for guiding electromagnetic radiation, the optical element comprising:
   a base body;
   a film; and
   a reflector film;
   wherein said film is configured to adhere to said base body and to form a connection with said base body without using an adhesion-promoting interlayer, said film being disposed between said base body and said reflector film, said reflector film and said film completely surrounding said base body in at least one cross section thereof and defining an air gap between said reflector film and said film, and wherein said film is arranged such that said electromagnetic radiation passes through it.

2. The optical element as in claim 1, wherein said optical element is configured as a waveguide.

3. The optical element as in claim 1, wherein said film is an optically active film.

4. The optical element as in claim 3, wherein said film contains particles for scattering the electromagnetic radiation.

5. The optical element as in claim 3, wherein said film contains a phosphor.

6. The optical element as in claim 5, wherein said phosphor is configured to convert said radiation into radiation of another wavelength.

7. The optical element as in claim 3, wherein said film has a non-smooth structure.

8. The optical element as in claim 1, wherein said film is arranged on a side face of said base body.

9. An optical device comprising:
   an optical element according to claim 1; and
   at least one light-emitting diode producing the electromagnetic radiation.

10. The optical element as in claim 1 wherein said base body is injection molded.

11. The optical element as in claim 1 wherein said base body is plate-shaped.

12. The optical element as in claim 1 wherein said base body is configured such that the electromagnetic radiation does not pass through a side face of the base body.

13. The optical element of claim 1 in which the base body comprises a rope-shaped base body.

* * * * *